United States Patent [19]
Meyerson et al.

[11] Patent Number: 5,818,028
[45] Date of Patent: Oct. 6, 1998

[54] PORTABLE DATA COLLECTION DEVICE WITH TWO DIMENSIONAL IMAGING ASSEMBLY

[75] Inventors: Robert F. Meyerson, Akron, Ohio; Ynjiun P. Wang, Fort Myers, Fla.

[73] Assignee: Telxon Corporation, Woodlands, Tex.

[21] Appl. No.: 787,668

[22] Filed: Jan. 23, 1997

Related U.S. Application Data

[63] Continuation-in-part of Ser. No. 544,618, Oct. 18, 1995, and Ser. No. 494,435, Jun. 26, 1995.

[51] Int. Cl.$^6$ .................................................. G06K 7/10
[52] U.S. Cl. ........................... 235/472; 235/462; 382/16; 382/17; 382/312
[58] Field of Search .................................. 235/462, 472, 235/463, 468; 382/17, 16, 61, 68, 313, 312; 345/163, 166

[56] References Cited

U.S. PATENT DOCUMENTS

| | | |
|---|---|---|
| 4,210,802 | 7/1980 | Sakai . |
| 4,409,470 | 10/1983 | Shepard et al. . |
| 4,734,566 | 3/1988 | Senda et al. . |
| 4,766,300 | 8/1988 | Chadima, Jr. et al. . |
| 4,835,615 | 5/1989 | Taniguchi et al. . |
| 4,877,949 | 10/1989 | Danielson et al. . |
| 4,952,966 | 8/1990 | Ishida et al. . |
| 4,962,432 | 10/1990 | Ohtsuka et al. . |
| 4,996,413 | 2/1991 | McDaniel et al. . |
| 5,010,580 | 4/1991 | Vincent et al. . |
| 5,019,699 | 5/1991 | Koenck . |
| 5,025,319 | 6/1991 | Mutoh et al. . |
| 5,080,456 | 1/1992 | Katz et al. . |
| 5,083,150 | 1/1992 | Nagasaki et al. . |
| 5,128,769 | 7/1992 | Aria et al. . |
| 5,130,520 | 7/1992 | Shepard et al. . |
| 5,131,053 | 7/1992 | Bernzott et al. . |
| 5,168,149 | 12/1992 | Dvorkis et al. . |
| 5,184,005 | 2/1993 | Ukai et al. . |
| 5,187,356 | 2/1993 | Chadima, Jr., et al. . |
| 5,200,597 | 4/1993 | Eastman et al. . |
| 5,210,398 | 5/1993 | Metlitsky . |
| 5,235,167 | 8/1993 | Dvorkis et al. . |
| 5,237,365 | 8/1993 | Miyazawa . |
| 5,243,666 | 9/1993 | Hasfeave et al. . |

(List continued on next page.)

FOREIGN PATENT DOCUMENTS

| | | |
|---|---|---|
| 60-129891 | 7/1985 | Japan . |
| 63-67692 | 3/1988 | Japan . |
| 63-83886 | 4/1988 | Japan . |
| 60-264383 | 10/1990 | Japan . |
| 3-198175 | 8/1991 | Japan . |
| 5-242287 | 9/1993 | Japan . |
| 6-162247 | 6/1994 | Japan . |

OTHER PUBLICATIONS

PCT International Search Report dated Sep. 18, 1996 (two pages).
PCT International Search Report date Nov. 7, 1996 (one page).

*Primary Examiner*—Donald T. Hajec
*Assistant Examiner*—Le Thien Minh
*Attorney, Agent, or Firm*—Watts, Hoffmann, Fisher & Heinke Co., LPA

[57] ABSTRACT

The invention relates to a portable data collection device. The device includes a two dimensional (2D) photosensor array imaging assembly selectively actuatable for reading bar code dataforms and recording an image of an item in the imaging assembly's target area or field. The portable data collection device includes two triggers, a first trigger actuatable for reading a bar code dataform and a second trigger actuatable for recording an image of an item in the target area. In one embodiment of the portable data collection device of the present invention, a radio module is provided for transmitting an output signal to a remote device. In another embodiment of the portable data collection device of the present invention, an output signal is coupled to a terminal processing board for further processing and storage.

19 Claims, 8 Drawing Sheets

U.S. PATENT DOCUMENTS

| | | |
|---|---|---|
| 5,245,445 | 9/1993 | Fujisawa et al. . |
| 5,258,604 | 11/1993 | Behrens et al. . |
| 5,262,871 | 11/1993 | Wilder et al. . |
| 5,272,538 | 12/1993 | Homma et al. . |
| 5,276,315 | 1/1994 | Surka . |
| 5,278,397 | 1/1994 | Barken et al. . |
| 5,291,009 | 3/1994 | Roustaei . |
| 5,293,238 | 3/1994 | Nakano et al. . |
| 5,296,690 | 3/1994 | Chandler et al. . |
| 5,308,960 | 5/1994 | Smith et al. . |
| 5,308,966 | 5/1994 | Danielson . |
| 5,309,243 | 5/1994 | Tsai . |
| 5,314,631 | 5/1994 | Katoh et al. . |
| 5,315,095 | 5/1994 | Maron et al. . |
| 5,319,181 | 6/1994 | Shelhammer et al. . |
| 5,331,143 | 7/1994 | Maron et al. . |
| 5,332,892 | 7/1994 | Li et al. . |
| 5,340,973 | 8/1994 | Knowles et al. . |
| 5,345,266 | 9/1994 | Denyer . |
| 5,349,172 | 9/1994 | Roustaei . |
| 5,352,884 | 10/1994 | Petrick et al. . |
| 5,354,977 | 10/1994 | Roustaei . |
| 5,359,185 | 10/1994 | Hason . |
| 5,386,271 | 1/1995 | Maekawa et al. . |
| 5,401,949 | 3/1995 | Ziemacki et al. . |
| 5,406,063 | 4/1995 | Jelen . |
| 5,408,084 | 4/1995 | Brandorff et al. . |
| 5,414,251 | 5/1995 | Durbin . |
| 5,418,357 | 5/1995 | Inoue et al. . |
| 5,420,635 | 5/1995 | Konishi et al. . |
| 5,420,943 | 5/1995 | Mak . |
| 5,448,293 | 9/1995 | Kogane et al. . |
| 5,468,947 | 11/1995 | Danielson et al. . |
| 5,468,950 | 11/1995 | Hanson . |
| 5,478,997 | 12/1995 | Bridgeall et al. . |
| 5,484,994 | 1/1996 | Roustaei . |
| 5,486,688 | 1/1996 | Iima et al. . |
| 5,496,992 | 3/1996 | Madan et al. . |
| 5,504,316 | 4/1996 | Bridgall et al. . |
| 5,559,555 | 9/1996 | Shimzu et al. . |

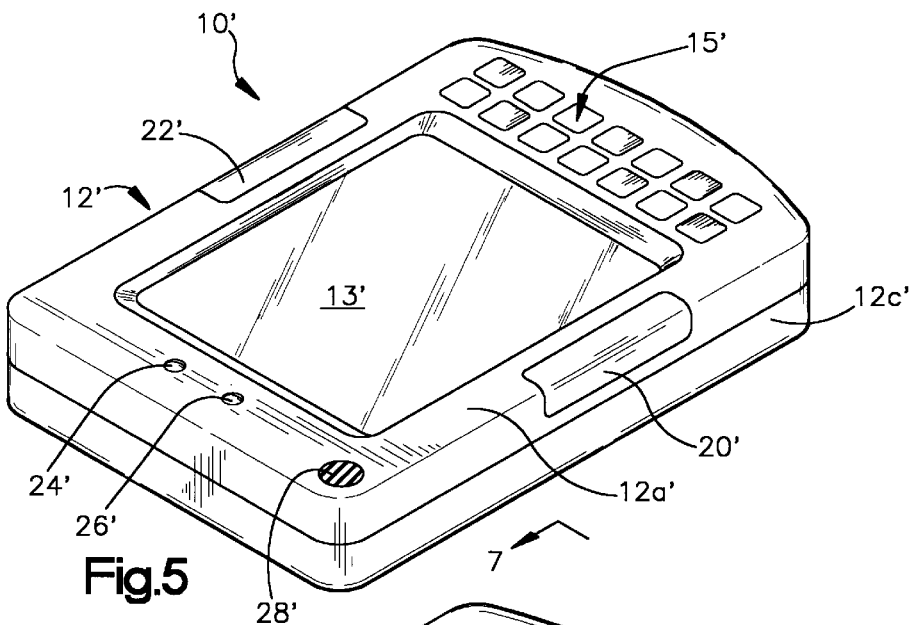
Fig.5
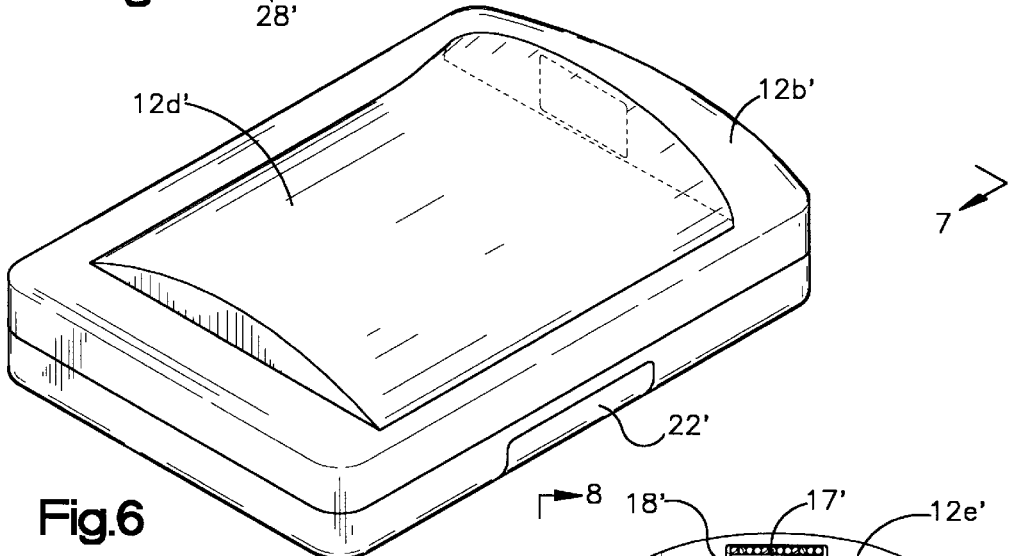
Fig.6
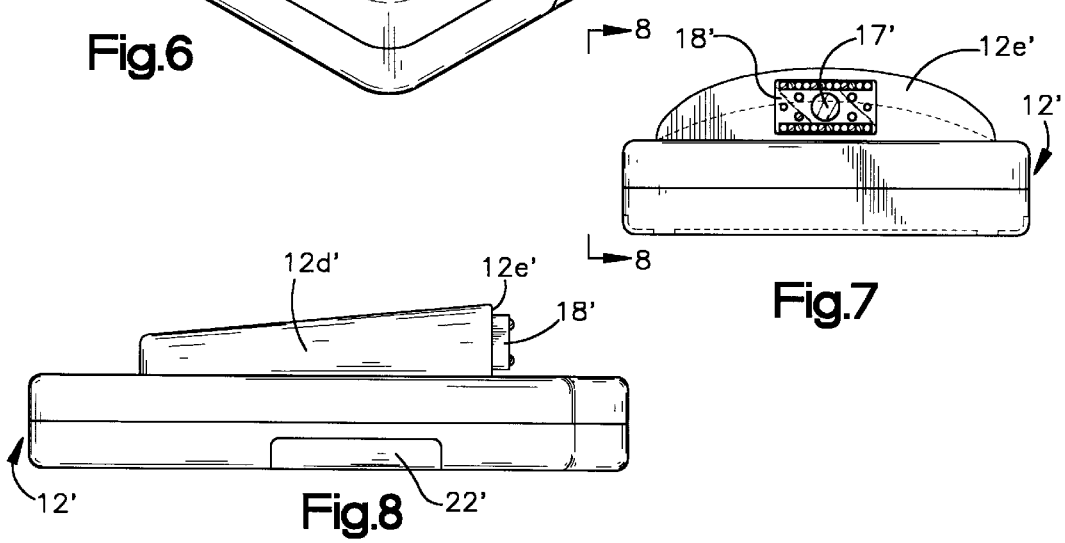
Fig.7
Fig.8

PORTABLE DATA COLLECTION DEVICE WITH TWO DIMENSIONAL IMAGING ASSEMBLY

CROSS REFERENCE TO RELATED APPLICATIONS

This application is a continuation-in-part of copending application Ser. No. 08/544,618, filed Oct. 18, 1995, entitled "Extended Working Range Dataform Reader Including Fuzzy Logic Image Control Circuitry" and is also a continuation-in-part of copending application Ser. No. 08/494,435, filed Jun. 26, 1995, entitled "Extended Working Range Dataform Reader". Each of the aforesaid copending applications is incorporated herein in its respective entirety by reference.

FIELD OF THE INVENTION

The present invention relates to a portable data collection device including a two dimensional photosensor array imaging assembly and, more particularly, to a portable data collection device having a two dimensional photosensor array imaging assembly selectively actuatable to read a bar code dataform and record an image of an item of interest.

BACKGROUND OF THE INVENTION

Portable data collection devices are widely used in manufacturing, service and package delivery industries to perform a variety of on-site data collection activities. Such portable data collection devices often include integrated bar code dataform readers adapted to read bar code dataforms affixed to products, product packaging and/or containers in warehouses, retail stores, shipping terminals, etc. for inventory control, tracking, production control and expediting, quality assurance and other purposes. Various bar code dataform readers have been proposed for portable data collection devices including laser scanners and one dimensional (1D) charge coupled device (CCD) imaging assemblies, both of which are capable of reading 1D bar code dataforms, that is, bar codes consisting of a single row of contrasting black and white bars of varying widths. Both of these readers are also capable of reading a "stacked" two dimensional (2D) bar code dataforms such as PDF417, which has row indicator patterns utilized by the reader for vertical synchronization.

A 2D imaging based dataform reader has been proposed in U.S. application Ser. No. 08/544,618, filed Oct. 18, 1995 and entitled "Extended Working Range Dataform Reader Including Fuzzy Logic Image Control Circuitry". The 2D dataform reader disclosed in the '618 application which is assigned to the assignee of the present application, includes an imaging assembly having a two dimensional array of photosensors or pixels adapted to read 2D bar code dataforms (e.g., UPC, C1 28, PDF417, etc.) with or without vertical synchronization row indicator patterns as well as matrix dataforms (e.g., MaxiCode, Data Matrix, Code 1, etc.). The 2D dataform reader disclosed in the '618 application utilizes an open loop feedback control system including fuzzy logic circuitry to determine proper exposure time and gain parameters for a camera assembly.

While using a portable data collection device to sequentially read bar code dataforms affixed to products or containers in a production facility, warehouse or retail store, an operator may come upon an item which is damaged, incomplete, mislabeled, in the wrong location, etc. In such a event, it would be desirable for the operator to make a note of the problem item so that appropriate corrective action may be taken by supervisory personnel. However, requiring the operator to make a handwritten notation on a clipboard or input information concerning the item using a keyboard or keypad of the portable data collection device is both time consuming and error prone.

What is needed is a portable data collection device having a 2D imaging assembly that can be actuated to read bar code dataforms by depressing a trigger and, when a problem item is found, the imaging assembly can be actuated with a separate trigger to record an image of the problem item. This would enable "information", that is, an image of the problem item, to be recorded without seriously interrupting the normal course of the operator's work. Additionally, it would be desirable to transmit the recorded image of the problem item to appropriate supervisory personnel so that appropriate corrective action may be taken. In certain instances, it may be sufficient to record a single frame of the image of a problem item, while in other cases, for example, if the item is larger than a field of view or target area of the imaging assembly, it may be necessary to record a continuous image of the problem item to permit the operator to record a complete view of the item. It would also be desirable to provide an audio capture module to simultaneously capture the operator's voice simultaneously with capturing the image of a problem item enabling the operator to provide further identification and/or commentary on the problem item to aid supervisory personnel in locating the item and taking appropriate corrective action.

Furthermore, in package delivery applications, upon delivery of a package, the delivery person typically uses a portable data collection device to read a bar code dataform affixed to the delivered package. Normally, the delivery person also obtains a signature of the person receiving the package. Typically, the signature of the person receiving the package is on a sheet of paper that must be filed with the package delivery records or on a signature capture digitizer pad so that the signature may electronically filed. What is needed is a portable collection data device having a 2D imaging assembly that can be actuated to read bar code dataforms by depressing one trigger and can be actuated by a separate trigger, or applications software, to record an image of a signature of a person receiving a package so that the signature can be filed electronically.

SUMMARY OF THE INVENTION

In accordance with this invention, a portable data collection device is provided that includes a two dimensional (2D) photosensor array imaging assembly selectively actuatable for reading bar code dataforms (bar code dataform reading mode) and recording an image of an item in the imaging assembly's target area or field (imaging mode). The portable data collection device includes two triggers, a first trigger actuatable for reading a bar code dataform and a second trigger actuatable for recording an image of an item in the target area. In one embodiment of the portable data collection device of the present invention, a radio module is provided for transmitting an output signal to a remote device. In another embodiment of the portable data collection device of the present invention, an output signal is coupled to a terminal processing board for further processing and storage.

The portable data collection device of the present invention further includes a image compression module for compressing a signal representative of a recorded image to reduce the quantity of data transmitted by the radio module.

Selection circuitry is provided which determines whether a given output signal representing a captured image will be compressed prior to output. An output signal representing a decoded dataform will not be compressed to avoid the possibility of accuracy loss resulting from application of the compression algorithm to the decoded data. On the other hand, the selection circuitry will couple an output signal representing a captured image to the image compression module to compress the signal prior to outputting the signal to the radio module or the terminal processing board.

In one operating embodiment of the imaging mode of the present invention, actuating the second trigger results in the imaging assembly capturing one frame of the target field. In a second operating embodiment of the imaging mode of the present invention, actuating the second trigger causes the imaging assembly to continuously capture successive frames as long as the trigger is actuated. Advantageously, the portable data collection device of the present invention includes an voice capture module which captures and digitizes sound received through a microphone mounted on the device during actuation of the second trigger. The digitized signal representing the captured sound portion is processed by a voice compression module prior to output to the radio module or the terminal processing board.

The imaging assembly includes a camera assembly having a two dimensional (2D) array of photosensors or pixels and a control and decoder board. The control and decoder board includes signal processing circuitry, decoding circuitry and exposure parameter control circuitry, serial output circuitry and a frame buffer memory for temporary storage of a signal corresponding to a captured image frame. The signal processing circuitry includes synchronization extractor circuitry and an analog to digital (A/D) converter for converting a composite video signal generated by the camera assembly to a digital signal. The control and decoder board further includes the selection circuitry noted above. The decoding circuitry includes a decoder for decoding 1D and 2D bar code dataforms. The exposure parameter control circuitry includes fuzzy logic control circuitry for controlling the frame exposure period and gain adjustment of the camera assembly.

The imaging assembly further includes an illumination module for illuminating a target item in the imaging assembly target area and an optics module for focusing reflected light from the target area upon the 2D array of photosensors of the camera assembly.

The optics module includes an optic element positioned to the front of the 2D photosensor array for focusing reflected light from the target area of view onto the photosensor array. A housing supports the optic element and shrouds ambient illumination from the photosensor array. The camera assembly includes the 2D photosensor array, exposure control circuitry and gain circuitry mounted on three spaced apart printed circuit boards. The illumination module includes an array of LED illuminators for uniformly illuminating the target area and two targeting LED illuminators for aiming the portable data collection device appropriately.

In a first embodiment of portable data collection device of the present invention, the device includes pistol-grip shaped housing enclosing circuitry of the device. An angled snout extending from a grip portion of the housing includes an opening through which a portion of the illuminator module and optics assembly extends. A finger operated trigger is provided on a target facing surface of the housing. The trigger is depressed by an operator to actuate the imaging assembly to read a bar code dataform in the target area. A push button actuator extends through an opening of the housing spaced apart from the trigger. The push button actuator is located so as to be depressible by the operator's thumb as the housing is cradled in the operator's hand. Depressing the push button actuator actuates the imaging assembly to capture an image of the target area.

In a second embodiment of the portable data collection device of the present invention, a thin rectangular shaped housing supports a workslate computer. The workslate computer includes an interactive display screen and a keypad supported by a top surface of the housing. The housing defines an interior region which encloses circuitry of the device. A side surface of the housing includes an opening through which a portion of the illumination module and optics assembly extend. Two push button actuators are provided on opposite sides of the display screen. One actuator actuates the imaging assembly to read a bar code dataform in the target area, while the other actuator actuates the imaging assembly to capture an image of the target area.

The aforementioned and other aspects of the present invention are described in more detail in the detailed description and accompanying drawings which follow.

BRIEF DESCRIPTION OF THE DRAWINGS

FIG. 5 is a perspective view of a second embodiment of a portable data collection device of the present invention;

FIG. 6 is another perspective view of the portable data collection device of FIG. 5;

FIG. 7 is a side elevation view of the right side of the portable data collection device of FIG. 5 as seen from a plane indicated by the line 7—7 in FIG. 6;

FIG. 8 is a side elevation view of the left side of the portable data collection device of FIG. 5 as seen from a plane indicated by the line 8—8 in FIG. 6;

DETAILED DESCRIPTION

Figure 1:
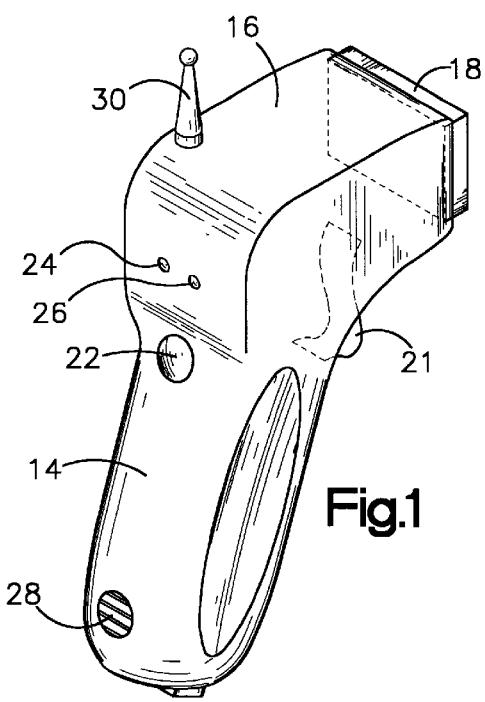
FIG. 1 is a perspective view of a first embodiment of a portable data collection device of the present invention.
Figure 2:
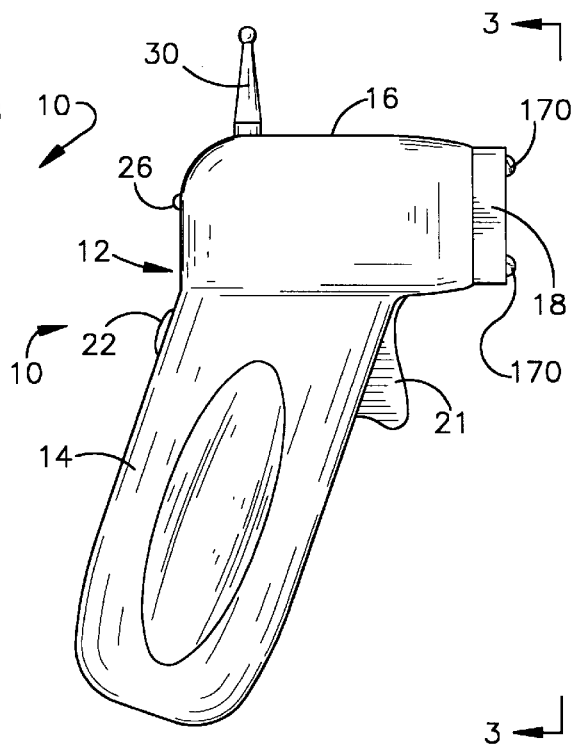
FIG. 2 side elevation view of the portable data collection device of FIG. 1.
Figure 3:
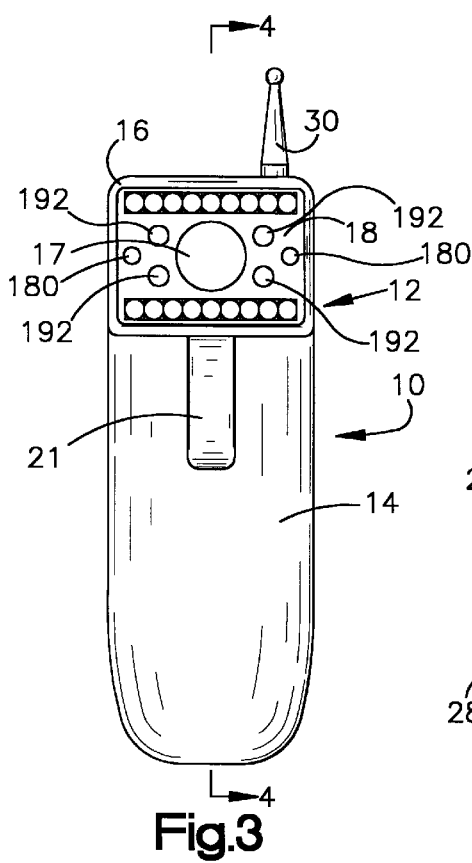
FIG. 3 is a front elevation view of the portable data collection device of FIG. 1 as seen from a plane indicated by the line 3—3 in FIG. 2.

Turning to the drawings, a portable data collection device in accordance with the present invention is shown at 10 in FIGS. 1–3. The data collection device 10 includes a housing 12 defining an interior region. The housing 12 includes a gripping portion 14 sized to be grasped in the hand of an operator and an angled snout 16 extending from the gripping portion. The snout 16 includes an opening through which a portion of an optics assembly 17 and a portion of an illumination module 18 extend. The optics assembly 17 and the illumination module 18 are components of a two dimensional (2D) photosensor array imaging assembly 19. An interior region of the gripping portion 14 may include printed circuit boards 20 and a power source 20a such as a rechargeable battery for supplying operating power to the portable data collection device 10.

A dataform reading trigger or actuator 21 extends through an opening in the gripping portion 14. Also extending through an opening in the gripping portion 14 is an imaging push button trigger or actuator 22. The dataform reading trigger 21 is positioned to be depressed by an index finger of the operator while the gripping portion 14 of the housing 12 is held in the operator's hand. The imaging trigger 22 is positioned to be depressed by a thumb of an operator while the gripping portion 14 of the housing 12 is held in the operator's hand.

The gripping portion 14 also includes two small openings through which a distal portion of a red light emitting diode (LED) indicator 24 and a distal portion of a green LED indicator 26 extend. Finally, the housing 12 includes an opening exposing a portion of a microphone 28 mounted in the housing interior region and another opening through which a radio antenna 30 extends. The interior region of the housing 12 supports the imaging assembly 19 and other electronic circuitry to be described below.

Figure 12:
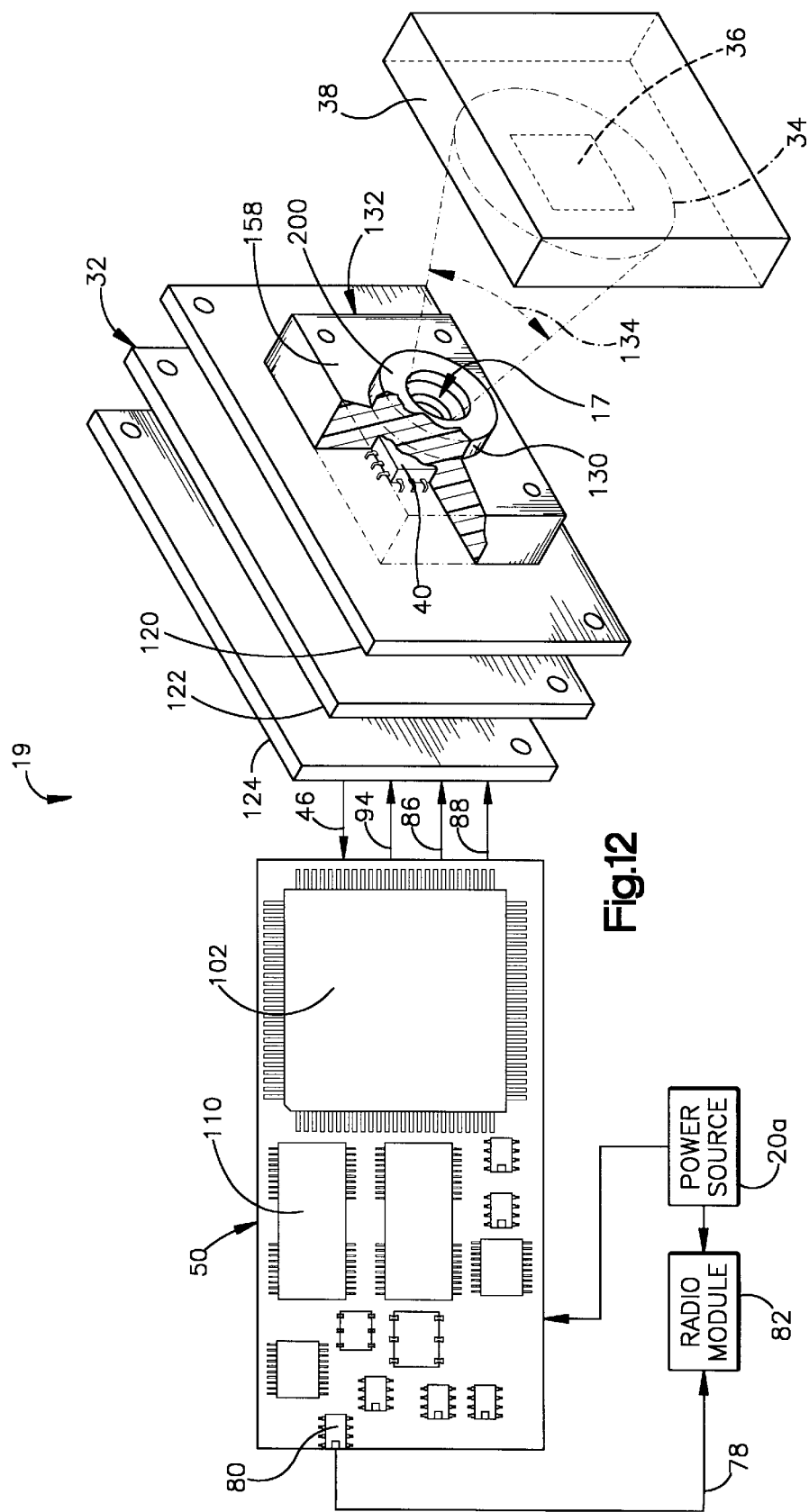
FIG. 12 is a view, partially in perspective with portions cut away, of the imaging assembly, with an illumination module removed, of the portable data collection device of the present invention.
Figure 13:
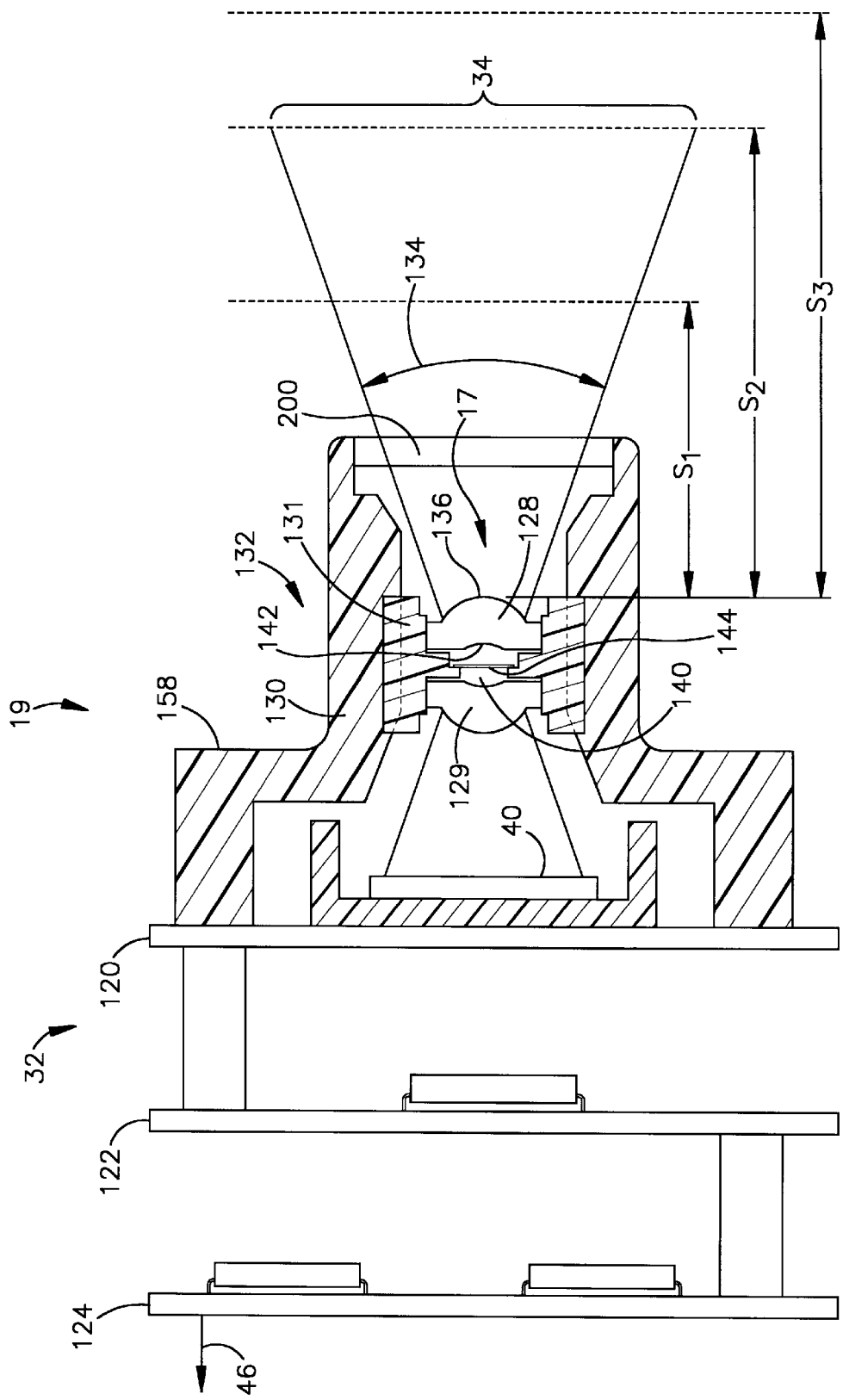
FIG. 13 is an enlarged sectional view of a portion of the imaging assembly of the portable data collection device of the present invention.

The imaging assembly 19 includes a camera assembly 32 which, when energized, captures successive images of a target field or area 34 (shown in dashed lines in FIGS. 12 and 13). The imaging assembly 19 is actuated by either the dataform reading trigger 21 to image and decode a dataform 36 (shown in dashed lines in FIG. 12) on an item 38 in the target area 34 (dataform reading mode) or the imaging trigger 22 to produce an image of the target area 34 (imaging mode). In the imaging mode, no decoding of the image occurs. The camera assembly 32 includes a 2D photosensor array 40 (shown in FIGS. 12 and 13 and schematically in FIG. 9).

In the preferred embodiment the photosensor array 40 is a 752 by 582 pixel matrix charge coupled device (CCD) which, when read out generates a "raw" interlaced video signal 42. This embodiment of the photosensor array 40 will be referred to as the interlaced CCD embodiment of the photosensor array. Alternatively, the photosensor array 40 could include a progressive scan CCD, a frame transfer CCD or an array of photodiodes and readout circuitry produced in accordance with U.S. Pat. No. 5,262,861 to Wilder which includes read out circuitry capable of independently and selectively reading out individual or group of pixels.

When the imaging assembly 19 is actuated, the camera assembly 32 produces successive frames of an image of the target area 34. In the interlaced CCD embodiment of the 2D photosensor array 40, the frames are composed of interlaced fields generated from reading out charges accumulated during an exposure period on the individual photosensors comprising the photosensor array. As can be seen schematically in FIG. 9, the "raw" interlaced video signal 42 from the photosensor array 40 is amplified and filtered by gain circuitry 43 of the camera assembly 32. The camera assembly 32 also includes exposure control circuitry 46 for controlling an exposure period of the 2D photosensor array 40 and synchronization circuitry 45 which adds standard synchronization and black level signals to the "raw" video signal 42 to generate an NTSC composite analog video signal 46.

The composite video signal 46 is coupled to signal processing circuitry 48 mounted on a control and decoder board 50. The signal processing circuitry 48 and other circuitry mounted on the control and decoder board 50 operates under the control of a microprocessor 51. The signal processing circuitry 48 includes an analog to digital (A/D) converter 52 which receives the composite video signal 46 and generates a series of 8 bit digital grayscale values each representing a pixel or photosensor of the photosensor array 40. The signal processing circuitry 48 further includes synchronization extraction circuitry 54 which matches each grayscale value to a pixel location in the photosensor array 40 and directs the grayscale value to the appropriate location in a frame memory buffer 57 also mounted on the control and decoder board 50. Each complete read out of the photosensors comprising the 2D photosensor array 40 comprises a field of an image. Two interlaced fields comprise a complete image frame.

Selection circuitry 56 mounted on the control and decoder board 50 and coupled to the frame buffer memory 57 receives successive image frames temporarily stored in the memory. Also coupled to the selection circuitry are a dataform read trigger circuit 21a which, in turn, is coupled to the dataform reading trigger 21 and an image capture trigger circuit 22a which, in turn, is coupled to the imaging trigger 22.

When an operator institutes a dataform reading session (dataform reading mode) by depressing the dataform reading trigger 21, the dataform read trigger circuit 21a sends a signal to the selection circuitry 56 causing the selection circuitry to couple a captured frame from the frame buffer memory 57 to image processing circuitry 58 which includes decoding circuitry 60 for decoding a dataform represented in the captured frame. The decoding circuitry 60 includes a decoder for decoding 1D and 2D dataforms in the target area 34. The decoding circuitry 60 operates on the stored frame of image data to extract dataform cell data (determine the black or white value of each cell of the dataform) and decode the cell data. Cell extraction is done in accordance with U.S. patent application Ser. No. 08/507,607 entitled, "Sub Pixel Dataform Reader With Dynamic Noise Margins", filed Oct. 13, 1995, Attorney Docket No. 92117, and assigned to the assignee of the present invention. The contents of application Ser. No. 08/494,435 (Attorney Docket No. 92117) is hereby incorporated by reference. Decoding of the cell data is accomplished by known decoding methods for each particular dataform format.

Also coupled to the selection circuitry 56 is image compression circuitry 62 and serial output circuitry 64. The selection circuitry 56 routes data 66 representing a decoded dataform data directly from the decoding circuitry 60 to the serial output circuitry 64. The decoded dataform data 66 is not compressed prior to output to the serial output circuitry 64. There is a possibility of error in the compression and subsequent decompression process and losing even a portion of a decoded dataform data may result in adverse consequences such as subsequent errors in updating inventory, determining the status or tracking an item, etc. Thus, the decoded dataform data 66 is not compressed.

When an operator institutes an imaging session (imaging mode) by depressing the imaging trigger 22, the image capture trigger circuit 22a sends a signal to the selection circuitry 56 causing the selection circuitry to couple a captured frame from the frame buffer memory 57 to image processing circuitry 58. The selection circuitry 56 will determine whether data representing the captured frame will be routed to image compression circuitry 62 to be compressed before being output to the serial output circuitry 64 or whether the data representing the captured frame will be routed directly to the serial output circuitry 64 without being compressed.

Generally, the selection circuitry 56 will be programmed to route the data representing a captured image frame to the image compression circuitry 62 because the occurrence of one or more errors in the data representing an image is normally not a significant problem. That is, an image of an item in the target area 34 will still be recognizable and useful to supervisory personnel viewing the image reconstructed from the captured image frame data even if there is some slight distortion of the image. After compression of the image data by the image compression circuitry 62, compressed image data 68 is routed to the serial output circuitry 64. If, however, a high resolution image is needed, the selection circuitry 56 may be appropriately programmed to route the data representing the captured frame directly to the serial output circuitry 64.

The image compression circuitry 64 utilizes an image compression algorithm to reduce the size of a set of digital image data. One such algorithm is the 2D wavelet transform compression algorithm as described in "A 64Kb/s Video Code Using the 2D Wavelet Transform" by A. S. Lewis and G. Knowles, published in IEEE Computer Society Press, Order No. 2202. The HARC Wavelet transform System utilizing such technology is available from Houston Advance Research Center in Houston, Tex. and is capable of compressing photographic data with an image compression ratio of up to 400:1.

Because the portable data collection device 10 is adapted for use in remote on-site locations for reading a dataform identifying a particular item or capturing an image of an item, it is desirable to enable a imaging assembly 19 to also capture a verbal message from the operator. The control and decoder board 50 also includes a voice capture module 70 for capturing and digitizing an operator's verbal message and voice compression circuitry 72 for compressing the captured verbal message. The voice capture module 70 is coupled to the microphone 28 and is operable by the selection circuitry 56 to capture and digitize audio input. The voice compression circuitry 72 compresses a digitized voice signal. Data 76 representing the compressed digitized voice signal is coupled to the serial output circuitry 64.

For a predetermined period of time after either the dataform reading trigger 21 is depressed to initiate a dataform reading session (dataform reading mode) or the imaging trigger 22 is depressed to initiate a image capture session (imaging mode), the selection circuitry 56 monitors the image capture trigger switch 22. If the operator depresses the trigger 22 during the predetermined period, the voice capture module 70 and voice compression circuitry 72 are activated for verbal input. As long as the operator keeps the trigger depressed, the circuitry 70, 72 will remain activated so that the operator can speak into the microphone 28 and provide information concerning an item whose image was captured or whose dataform was read which will be transmitted and/or stored with the corresponding image or decoded dataform. Normally, the voice capture module 70 will be used subsequent to an imaging session where the operator wants to communicate to supervisory personnel reviewing the captured image some additional information concerning the imaged item such as the item's location, a short description of the problem with the item, etc. The voice compression circuitry 72 utilizes one of a number voice compression algorithms well known to those skilled in the art.

Decoded dataform data 66, compressed image data 68 and compressed digitized voice data 76 are routed to the serial output circuitry 64 which assembles output data 78 for serial output through a serial output port 80. In portable data collection device 10 of the present embodiment (FIGS. 1–4) the serial output port is coupled to an input port of a radio module 82 (shown in FIG. 4 and schematically in FIG. 12). The radio module 82 modulates and transmits the output data 78 to a remote device (not shown) where the transmitted data is demodulated. The demodulated output data may be used to update inventory, and/or accounting records, update production control expediting or product tracking files, permit supervisory corrective action to remove/repair damaged items, etc.

The control and decoder board 50 further includes exposure parameters control circuitry 84 which outputs control signals 86, 88 to the exposure period circuitry 44 and the gain circuitry 43 of the camera assembly 32 and a signal 89 embodying an appropriate set of reference voltages for operating the A/D converter 52. The exposure parameters control circuitry 84 includes fuzzy logic circuitry 90 which analyzes captured frames of data accessed from the frame buffer memory 57. The fuzzy logic circuitry 90 analyzes a captured frame to determines if the current exposure period of the 2D photosensor array 40, the current amplification of the "raw" video signal 43 by the gain circuitry 43 is and the reference voltages used by the A/D converter 52 are resulting in an "acceptable" captured image frame. If not, the control signal 86 is changed to adjust the exposure period of the 2D photosensor array 40 and/or the control signal 88 is changed to adjust the amplification of the "raw" video signal 42 and/or the signal 89 is changed to adjust the operation of the A/D converter 52. After the adjustment, another captured frame is analyzed by the fuzzy logic circuitry 90 and, if necessary, further adjustments are made in an iterative fashion until the camera assembly 32 produces an "acceptable" captured image.

Figure 9:
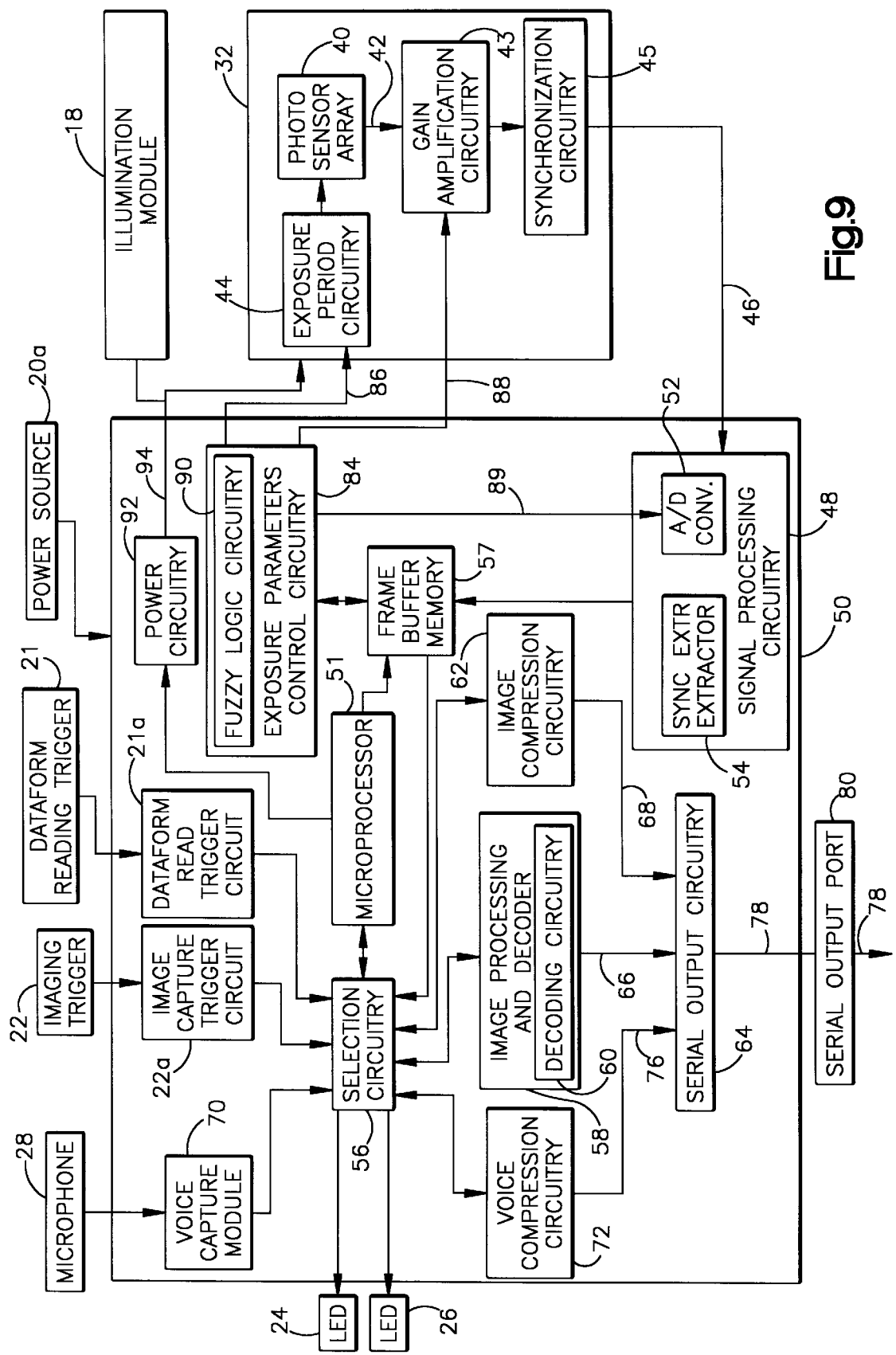
FIG. 9 is a block diagram of selected circuitry of the portable data collection device of the present invention.

As can be seen in FIGS. 9 and 12, the power source 20a is coupled to the control and decoder board 50 to provide operating power to the microprocessor 51 and other circuitry mounted on the board and the radio module 82. Power circuitry 92 under the control of the microprocessor 51 is coupled through a lead 94 to the illumination module 18 and the camera assembly 32 to supply power to these components of the imaging system 19.

Figure 10:
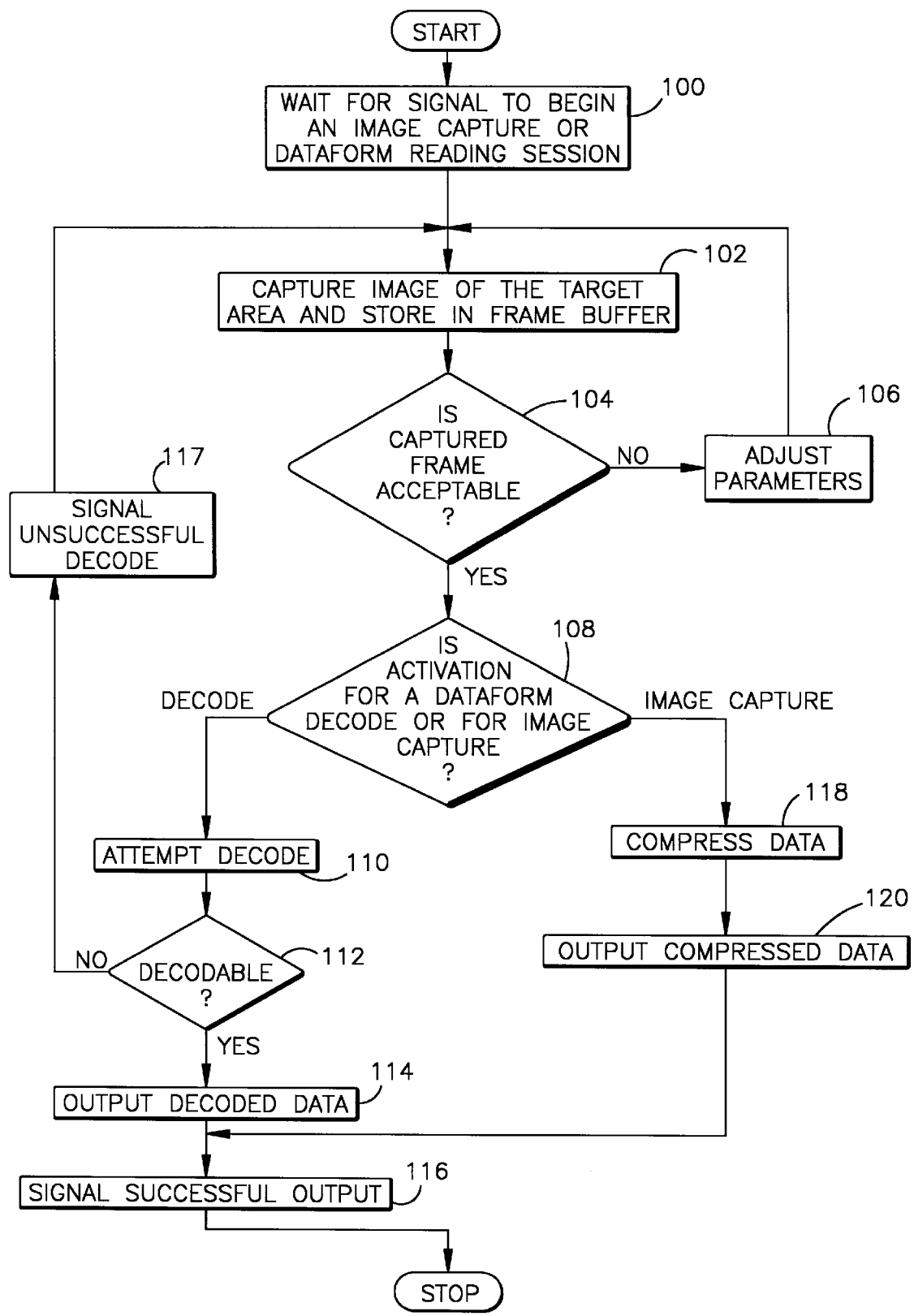
FIG. 10 is a flow chart setting forth one operating embodiment of the portable data collection device of the present invention to decode a bar code dataform and capture an image of a target area.
Figure 11:
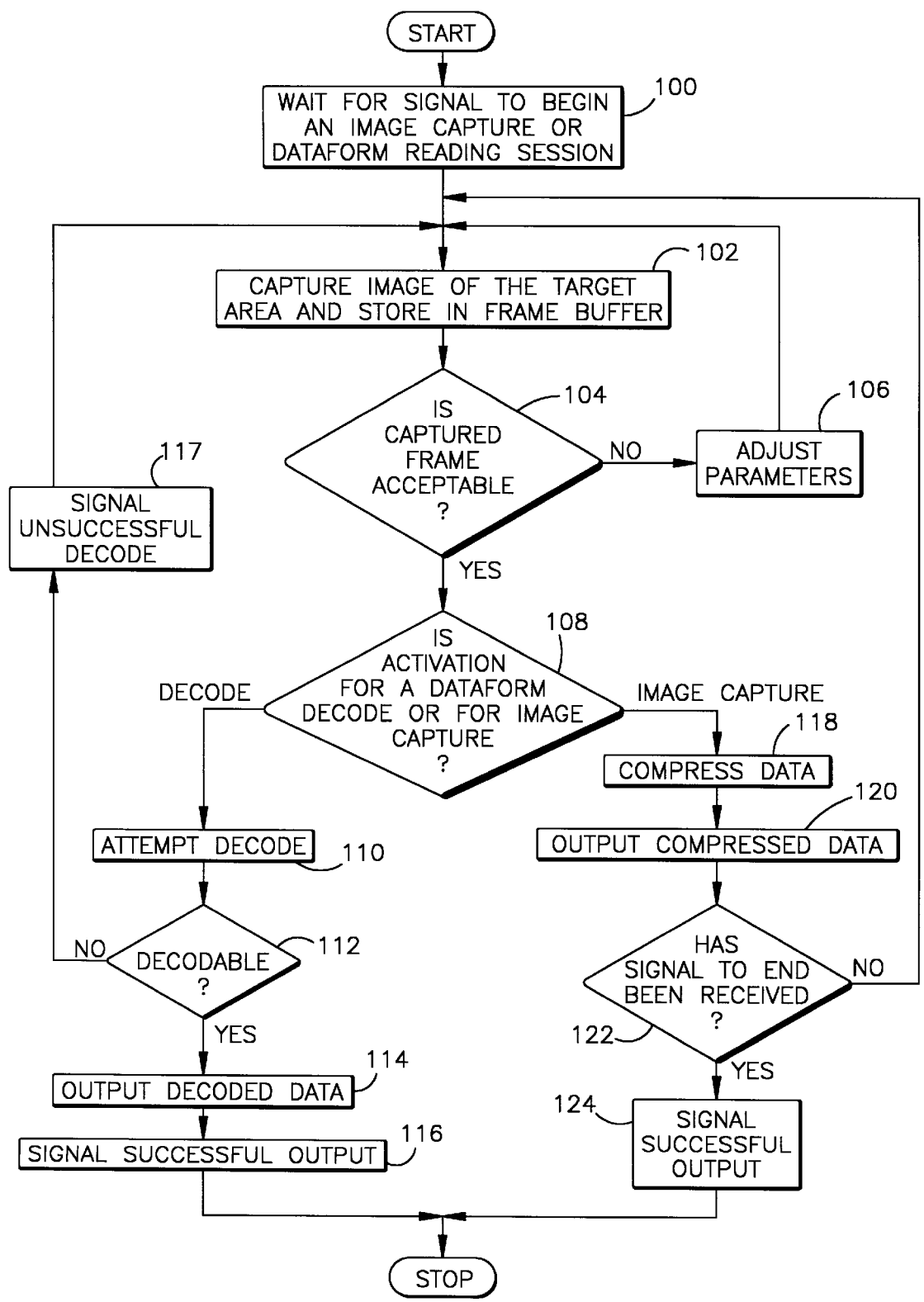
FIG. 11 is a flow chart setting forth an alternate operating embodiment of the portable data collection device of the present invention to decode a bar code dataform and capture an image of a target area.

The flow chart shown in FIG. 10 illustrates the operation of the imaging assembly 19 in the dataform decoding mode and one operating embodiment of the imaging mode. The flow chart shown in FIG. 11 illustrates the operation of the imaging assembly 19 in the dataform decoding mode and a second operating embodiment of the imaging mode. In the first operating embodiment of the imaging mode, a single frame of the image in the target area 34 is captured, compressed and output when the operator depressed the imaging trigger 22. In the second operating embodiment of the imaging mode, successive frames of the image in the target area 34 are captured, compressed and output as long as the operator has the imaging trigger 22 depressed.

The imaging mode is advantageously employed when the operator using the portable data collection device 10 notices the item 38 is damaged, out of place, incomplete, etc. The imaging mode of the imaging assembly 19 is used to capture an image of the item 38 and, using the radio module 82, transmit the captured image to a remote device accessible by supervisory personnel so that the problem may be ascertained by supervisory personnel and appropriate corrective action taken, e.g., deletion of item from inventory records, issuance of order to remove item from storage location and return to production facility or vendor for rework/repair, moving item to proper location, filing insurance claim, etc.

Turning to the first operating embodiment of the imaging mode shown in FIG. 10, at 100 the imaging assembly 19 waits for a signal representing either actuation of the imaging trigger 22 or the dataform reading trigger 21 to commence either an image capture session or a dataform reading session. The signal may be generated by the image capture trigger circuit 22a, the dataform reading trigger circuit 20a or by a signal generated by customer specific application software. At 102, upon receiving an appropriate signal, the imaging assembly 19 is activated and an image frame is captured and stored in the frame buffer memory.

At 104, the fuzzy logic circuitry 90 determines if the captured image frame is acceptable, that is, the image is within predetermined acceptable ranges for brightness and the magnitude of charges on the photosensors of the 2D photosensor array 40. If the fuzzy logic circuitry 90 determines the captured frame is not acceptable, one or more of the operating parameters of the camera assembly and the A/D converter 52 are modified as shown at 106. The loop represented by 102, 104, 106 is repeated until the captured frame is determined to be acceptable.

At 108, the selection circuitry 56 determines that the activation signal is from the dataform reading trigger 21 requiring a dataform decode, the captured frame is coupled to the decoding circuitry 60 for attempted decoded of the dataform represented in the captured frame. At 110, the decoding circuitry 60 attempts to decode the dataform represented in the captured frame. At 112, a determination is made if the decoding was successful. At 114, if the decoding was successful, the extracted decoded data is output to the serial output circuitry 64 and at 116, the green LED indicator 26 is energized for a predetermined time to signal the operator that the dataform 36 in the target area 34 has been successfully read. Subsequently, the imaging assembly 19 is turned off.

If at 112, the decoding was not successful, the selection circuitry at energizes the red LED indicator 24 for a predetermined time to signal to the operator that the decoding was unsuccessful and that he or she should continue to point the device 10 at the dataform 36 in the target area 34. The process returns to 102 where another image frame is capture and the remaining steps are repeated.

Alternatively, if at 108, the selection circuitry 56 determines that the activation signal is from the imaging trigger 22, the captured frame is routed to image compression circuitry 62 to compress the data in the captured frame, shown at 118. At 120, the compressed image data is output to the serial output circuitry 64 and the green LED indicator 26 is energized to signal the operator that the image in the target area 34 has been successfully captured.

In an second operating embodiment of the imaging mode, successive frames of an image of the target area 34 are captured for as long as the operator maintains the imaging trigger 22 depressed. This operating embodiment would be advantageous in situations where the item 36 which the operator wishes to image because of some defect, damage, etc., is very large compared to the area of the target area 34. Therefore, capturing a single image frame and transmitting a signal corresponding to the captured frame to a remote device or supervisory review may not provide supervisory personnel with an image covering a large enough portion of the item 34 to ascertain the problem and determine appropriate corrective action. By capturing successive frames during the period that the operator keeps the imaging trigger 22 depressed, the operator may move the portable data collection device 10 with respect to the item 34 to provide a video image of the complete item (or an image of as much of the item as necessary to provide for identification of the item and the item's problem).

Turning to FIG. 11, for this embodiment the process remains generally the same as the embodiment described in connection with FIG. 10. However, after the output of compressed data to the serial output circuitry 64 at 120, the selection circuitry 56, at 122, checks to see if a signal has been received from the image capture trigger circuitry 22a indicating that the operator has released the imaging trigger 22. If such a signal from the image capture trigger circuitry 22a has been received, then at 124, the selection circuitry 56 energizes the green LED indicator 26 for a predetermined time period to signal the operator that the image in the target area 34 has been successfully captured. Subsequently, the imaging assembly 19 is turned off.

If no signal is received from the image capture trigger circuitry 22a indicating that the operator has released the imaging trigger 22, then the process loops back to 102 and successive image frames are captured, compressed and output to the serial output circuitry 64 until such time as the selection circuitry 56 received the signal from the image capture trigger circuitry 22a indicating that the imaging trigger 22 has been released.

As can best be seen in FIGS. 9 and 12, the imaging assembly 19 includes the camera assembly 32 which is electrically coupled to the control and decoder board 50. The control and decoder board 50 includes the microprocessor 51 and associated circuitry. The circuitry of the imaging assembly 19 may by embodied in software resident in one or more RAM or ROM memory chips 110 mounted on the board 50 and operated by the microprocessor 51. Alternately, the circuitry of the imaging assembly 19 may comprise separate application-specific integrated circuitry (ASIC) mounted on the control and decoder board 50.

As can be seen in FIG. 12, the camera assembly 32 includes three spaced apart spaced apart printed circuit boards 120, 122 and 124 (corresponding to first, second and third printed circuit boards). The 2D photosensor array 40 is supported by the first printed circuit board 120 and receives reflected illumination from the target area 34. The optics assembly 17 is positioned between the photosensor array 40 and the target area 34 to focus an image of the target area on the photosensor array. A camera housing 132 (FIGS. 12 and 13) is secured to the first printed circuit board 120 overlying the photosensor array 71. The camera housing 132 supports the optic assembly 17 and shrouds the photosensor array 40 from ambient illumination.

The photosensor array 40 is an interlaced charge coupled device (CCD). When operational, the photosensor array 40 generates the raw video signal 42 wherein the instantaneous voltage magnitude during a readout period represents the quantity of illumination accumulated on an individual photosensor element or pixel of the photosensor array 40 during an exposure period. The order in which the pixels are read out is interlaced. The exposure period circuitry 44, the gain circuitry 43 and the synchronization circuitry 45 are mounted on the three printed circuit boards 120, 122, 124 for controlling the exposure period for the photosensor array 40, generating clock signals to drive the read out of the photosensor array, amplifying the raw video signal 42 and generating industry standard synchronization signals and black level signals necessary to generate the industry standard composite analog video signal 46.

Figure 4:
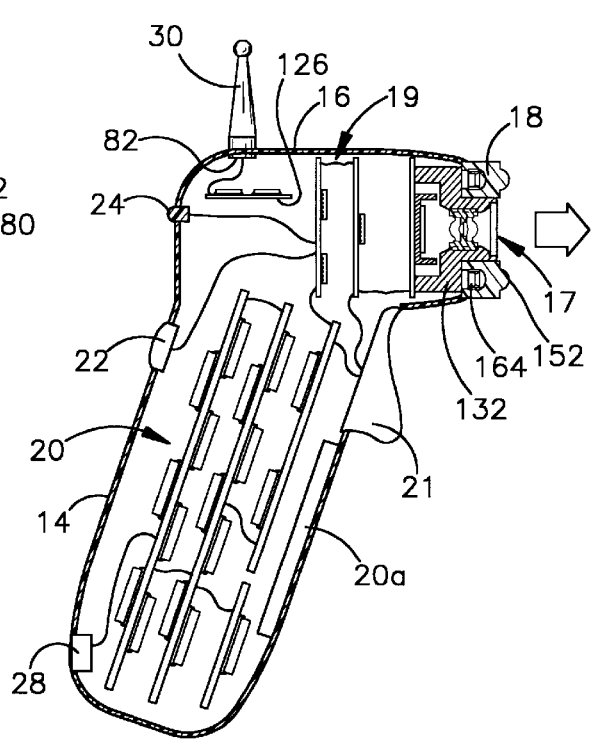
FIG. 4 is a sectional view of the portable data collection device of FIG. 1 as seen from a plane indicated by the line 4—4 in FIG. 3.

The radio module 82 includes a spread spectrum micro radio mounted on a board 126 (FIG. 4). The external antenna 30 operates to improve radio communication reception. The spread spectrum radio board 126 includes digital and analog circuitry for transmitting and receiving data in a wireless network such as an IEEE 802.11 compatible direct sequence spread spectrum or frequency hopping spread spectrum network.

The radio module 82 and the imaging assembly 19 both draw significant current from the power source 20a. Therefore, the radio module 82 should not operate during an imaging session or a dataform reading session to limit peak current draw. Therefore, the radio module 82 and the imaging assembly 19 provide blocking signals to each other to assure that both components do not draw power simultaneously. The blocking signal from the radio module 82 to the imaging assembly 19 will prevent the initiation of an imaging or dataform reading session. The session will be delayed until the signal desists. The blocking signal from the imaging assembly 19 to the reader module 82 will prevent the radio module from sending or receiving data packets during an imaging or dataform reading session. Therefore, the network transmission protocol must be such that the radio module 82 has complete control over when to transmit a packet and when it can receive a data packet. One such network protocol is the reverse poll protocol as described in U.S. Pat. No. 5,276,680 and assigned to Telesystems S/W Inc. U.S. Pat. No. 5,276,680 is hereby incorporated in its entirety by reference.

In the reverse poll protocol network, the portable device radio may transmit data packets to a network access point at any time, subject to the carrier frequency being free. However, the access point can only send a packet to the portable device within a time window following receipt of a packet from the portable device. To assure that the access point has enough opportunities to transmit data to the portable data collection device 10, the device will periodically send packets even though the packets contain no significant data.

The performance of the portable data collection device imaging assembly 19 is enhanced by the optics assembly 17 which has an extended working range. Turning to FIG. 13, the optics assembly 17 includes a set of two spaced apart lens 128, 129 which are supported by an insert 131 in a nose portion 130 of a camera housing 132. Based on the distance between the set of lens 128, 129 and the photosensor array 40, there exists a best focus position S2 in front of the set of lens 128, 129 at which an image of an object in the object or target area 34 will be sharpest on the photosensor array 40. The image gradually degrades as the object is moved towards the near field cut off distance S1 and a far field cut off distance S3. The set of lens 128, 129 also has an angular field of view 134 (FIGS. 12 and 13) which is wide enough to image large dataforms at the far field S3 and still provide a large image of a small dataform located at the near field S1.

In the preferred embodiment of the portable data collection device 10, the set of lens 128, 129 has a working range from about 2.5 inches to at least 8.5 inches from a front surface 136 of the outermost lens 128, with best focus distance being at 5.5 inches. The preferred field of view corresponds to a target area or surface 5 inches long by 3.75 inches wide at a distance of 8.5 inches from the front surface 136 of the outermost lens 128.

The optics assembly 17 that will meet these requirements includes a symmetrical set of two substantially identical lens 128, 129. The lens 128, 129 are positioned with mirrored symmetry about an opening 140. The front surface 135 of the lens 128 is aspherical having a magnitude and shape defined as an even asphere having a radius of curvature of 1.5298 mm, a conic constant of −0.019890, a 6th order aspheric deformation coefficient of 0.0096 mm, an 8th order coefficient of −0.0057, and a 10th order coefficient of 0.0023. A back surface 142 of the lens 156 is a spherical surface with a radius of curvature of 1.6004 mm. The aperture 160 has a width of 0.3606 mm between the lenses 128, 129 providing the optics assembly 17 with an F#13. Supported in a middle of the aperture 160 by the insert 131 is a thin metal disc 144 having a small central opening (not shown). The metal disc 144 functions to increase the F# of the optics assembly 17. The diameter of the lens 128, 129 are not critical to the present invention. A more detailed discussion of the optical system 302 of this invention can be found in U.S. patent application Ser. No. 08/494,435, assigned to the same assignee as the present invention. The contents of U.S. patent application Ser. No. 08/494,435 is incorporated herein in its entirety by reference.

Because the optics assembly 17 is used in the portable data collection device 10, it is desirable that the optics assembly be lightweight and impact resistant. In the preferred embodiment, the optical material used for fabricating the lenses 128, 129 is comprised of plastic. Using plastic optics will reduce the weight of the set of lens 128, 129 by about 60% compared to an equivalent glass set and provide an optics assembly 17 which is more impact resistant. Another benefit of using plastic optics is that the costs associated with grinding aspherical surfaces on glass lenses is avoided. An aspherical surface is easily formed by injection molding a plastic lens. While the optics assembly 17 set forth herein provides desired attributes, those skilled in the art are aware of other optics with similar performance characteristics.

Because the desired working range and field of view of the imaging assembly 19 dictates that the optics assembly 17 have a large F# (F#5.6 or greater), the illumination module 18 must provide adequate illumination of the target area 34 during the exposure period so that enough reflected light is absorbed by the photosensor array 40 to generate a suitably bright video image. However, the exposure period is normally limited to 0.01 seconds or less to minimize the effect of the operator's hand jittering during the reading session. Therefore, the illumination module 18 of the imaging assembly 19 must provide adequate illumination to accommodate the large F# and short exposure time.

Figure 14:
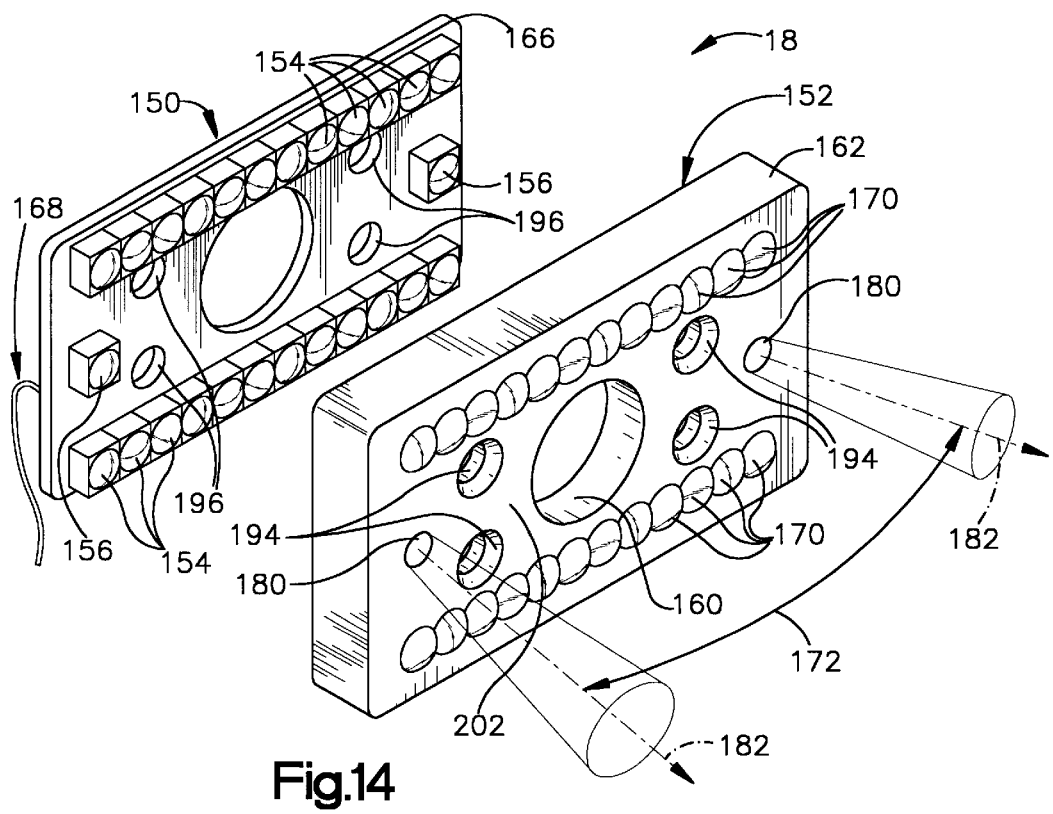
FIG. 14 is a perspective view of an illumination module of the imaging assembly of the portable data collection device of the present invention.
Figure 15:
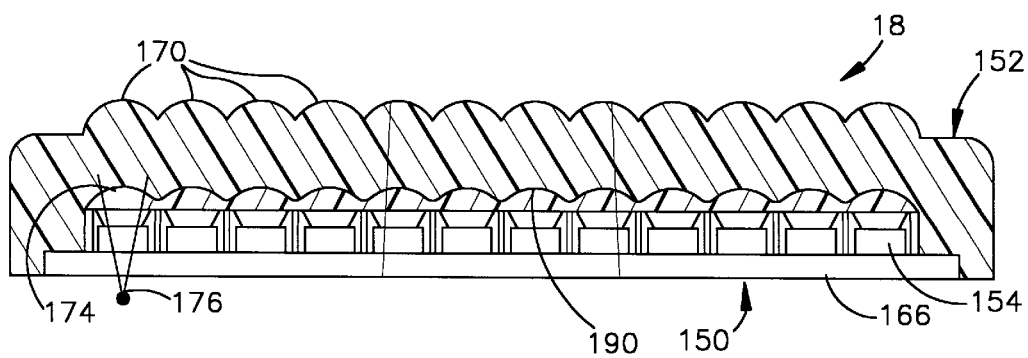
FIG. 15 is a sectional view of the illumination module of FIG. 14.

Turning to FIGS. 14 and 15, the illumination module 18 is comprised of two sandwiched retangular components 150, 152. The first or illumination component 150 provides illumination and includes a set of illumination light emitting diodes (LEDs) 154 and a pair of targeting or aiming LEDs 156. The second component 152 provides focusing of the illumination provided by the first component 150. The illumination module 19 is energized in conjunction with operating the camera assembly 32 to provide sufficient illumination to permit the imaging dataform reading assembly to capture a decodeable image of the target area 34. Details of a suitable illumination module are disclosed in application Ser. No. 08/484,435, filed Jun. 26, 1995, entitled "Extended Working Range Dataform Reader". The illumination module 19 is mounted to a front portion 158 (FIGS. 12 and 13) of the camera housing 132. The illumination module 19 is shown mounted to the camera housing 132 in FIG. 4.

A seal (not shown) may be disposed between a nose portion 130 of the camera housing 132 and an inner peripheral wall 160 of the second component 152 to create a tight seal between the camera housing 132 and the illumination module 19 to prevent dirt and moisture from entering the interior region of the portable data collection device 10. Also, a seal (not shown) may be disposed between an outer peripheral wall 162 of the second component 152 and an inner wall 164 of the angled snout 16 which defines the opening into which the illumination module 18 extends through.

Proper exposure of the photosensor array 40 requires an object field illumination of 0.3 lux assuming an exposure period of 0.03 seconds and an F#1.2. To determine the proper object field illumination for a 0.01 second exposure period and an F#13, the following formula is used:

$$\frac{(\text{Illumination intensity})(\text{Exposure period})}{(F\#)^2} = \text{Constant}$$

Therefore, the minimum required object field illumination for the imaging assembly 19 of this invention is 106 lux at the far field cut off distance S3.

Referring to FIG. 14, which is an exploded perspective view of the illumination module 18, the first component 150 comprises a printed circuit board assembly 166 which supports the set of surface mounted illumination LEDs 154 and the two targeting LEDs 156. The printed circuit board assembly 166 includes printed conductors and a power lead 168 operative for supplying power to the illumination LEDs 154. A suitable surface mount illumination LED is produced by the MarkTech Corporation of Latham, N.Y., as Part No. MTSM735K-UR or MTSM745KA-UR. Each illumination LED 154 provides illuminosity of 285 mini candela (mcd) over an angular illumination field of about 68°. The small footprint of the illumination LEDs 154 provides for twelve to be placed in a row measuring less than 1.5". The printed circuit board assembly 166 includes two rows of illumination LEDs 154 totaling twenty four LEDs providing 6840 mcd of uniform illumination over a 68° field.

The focusing component 152 includes a plurality of illumination lens cell 170 each of which are aligned with a corresponding illumination LED 154. The exposure illumination lens cells 170 direct a 68° field of illumination from each illumination LED 154 into a smaller uniform illumination field having an angular field of view 172 which is substantially the same as the angular field of view 134 of the optics assembly 17 (about 50° shown in FIGS. 12 and 13).

Referring to FIG. 15, which shows a cross section of the assembled illumination module 18, it can be seen that each illumination lens cell 160 has an inner lens surface 174 and a focal point 176. By locating the illumination LEDs 154 between the focal point 176 and the inner lens surface 174, the lens cell 170 acts as a light directing element rather than an imaging element thereby avoiding hot spots in the target area 34 and providing a highly uniform illumination. The 68° field of illumination from each illumination LED 154 is gathered by its respective illumination lens cell 170 and directed into a field corresponding to the optics assembly field of view 172 which is smaller than 68°. Furthermore, because the fields of view of the exposure illuminator lens cells 170 overlap, there is "cross talk" between the illuminator LEDs 154 such that illumination from two or more illumination LEDs is directed towards the same portion of the target field 34.

Over the optics assembly field of view 172, the 6840 mcd of illumination provided by the illumination LEDs 154 will provide an illumination intensity in excess of 106 lux at the far field cut-off distance of 8.5"(S3 in FIG. 13).

Referring back to FIG. 14, two targeting lens elements 180 positioned over two targeting LEDs 156 project two pencils of targeting illumination 182, forming hot spots, into the target area at angles corresponding to the optics assembly field of view 172. The hot spots are visible to the operator and facilitate aiming of the portable data collection device 10 so that the target dataform 36 is brought within the target area 34.

The focusing component 152 forms the front surface of the illumination module 18 protecting the printed circuit board assembly 166 of the first component 150 from physical impact as well as from dirt, moisture and other harmful elements found in the environment. Therefore, the focusing component 152 is preferably molded of an impact resistant acrylic or other suitable material that has a high illumination transmittivity and durability necessary for the environment in which the portable data collection device 10 is operated. To further protect the printed circuit board assembly 166 from harmful elements in the environment, a conformal coating is applied to the board assembly and the assembly is bonded into a cavity 190 in a back of the second component 152 with a cynoacrolate, UV curing or structural adhesive.

Referring to FIGS. 4, 12, 13 and 14, the illumination module 18 may be secured to the front portion 158 of the camera housing 132 by inserting four screws 192 (FIG. 3) through the four holes 194 in the illumination module second component 152 and corresponding four holes 196 in the illumination module first component 150 and threading them into the co-axially aligned holes 198 in the camera housing 132. The camera housing nose 130 extends through a central opening in the illumination module 18 with a distal end 200 of the camera housing nose (FIG. 13) being substantially flush with a front surface 202 of the illuminator module second component 152.

Optionally, a filter may be positioned in a distal portion 200 of the camera housing. The filter would permit only reflected illumination corresponding to the wavelength of the illuminator LEDs 154 to pass through the filter to the photosensor array 40 thereby preventing ambient light from interfering with the capture of the image in the target area 34.

An alternate embodiment of the portable data collection device of the present invention is shown in FIGS. 5–8. Similar reference numbers will be used to describe this embodiment as were used in the embodiment shown in FIGS. 1–3. A portable data collection device including a workslate computer is shown generally as 10' in FIGS. 4–7. The data collection device 10' includes a housing 12' defining an interior region. The housing 12' includes an upper surface 12a' and a lower surface 12b' separated by a side wall 12c'. A portion 12d' of the lower surface 12b' is bowed outwardly to provide additional space in the interior region. A side wall 12e' of the bowed portion 12d' includes an opening through which a portion of an optics assembly 17' and a portion of an illumination module 18' extend.

The optics assembly 17' and the illumination module 18' are components of a two dimensional (2D) charge coupled device (CCD) imaging assembly 19'. The upper surface 12a' includes an opening through which an touch sensitive display screen 13' is visible which can be used to view output data and graphic displays as well as input data and commands to a microprocessor in the interior region which controls functioning of the device 10'. Input of data and commands to the microprocessor may also be accomplished through a keypad 15' having a plurality of keys which are supported on the upper surface 12a'.

A dataform reading trigger or actuator 20' extends through an opening in the upper and side surfaces 12a', 12c'. On an opposite side of the display screen 13' is an imaging trigger or actuator 22' extends through an opening in the upper and side surfaces 12a', 12c'.

The upper surface 12a' includes two small openings through which a distal portion of a red light emitting diode (LED) indicator 24' and a distal portion of a green LED indicator 26' extend. Finally, the upper surface 12a' of the housing 12' includes an opening exposing a portion of a microphone 28' mounted in the housing interior region. The interior region of the housing 12' supports the imaging assembly 19' and other electronic circuitry. In both embodiments of the portable data collection device 10, 10', the imaging assembly 19 and associated circuitry are identical and it should be understood that descriptions thereof apply equally to both embodiments. A major distinction between the two embodiments 10 and 10' is that the workslate embodiment 10' does not include a radio module. Rather, the serial digital output data 78 is coupled to an input port of a terminal processing board (not shown). The processing board may further process the data 78 and store the resulting processed data. After completing a work shift, an operator may drop of the device 10' where the processed data will be downloaded from the processing board memory for updating records and/or analysis of stored image representations.

While the description has described the currently preferred embodiments of the invention, those skilled in the art will recognize that other modifications may be made without departing from the invention and it is intended to claim all modifications and variations as fall within the scope of the invention.

In compliance with the statute, the invention has been described in language more or less specific as to structural and methodical features. It is to be understood, however, that the invention is not limited to the specific features shown and described, since the means herein disclose comprise preferred forms of putting the invention into effect. The invention is, therefore, claimed in any of its forms or modifications within the proper scope of the appended claims appropriately interpreted in accordance with the doctrine of equivalents.

We claim:

1. A portable data collection device comprising:
   a) a camera assembly, including a two dimensional photosensor array comprising multiple rows of photosensor elements which are read out after an exposure period to generate a signal representative of an image of a two dimensional target area;
   b) an optics assembly positioned to focus illumination reflected from the target area onto the photosensor array;
   c) signal processing circuitry coupled to the camera assembly, receiving the signal, converting the signal to digital image data representative of the image of the target area and buffering the digital image data;
   d) decoder circuitry coupled to the signal processing circuitry for decoding a portion of the digital image data representative of an image of a dataform in the target area and providing decoded dataform data corresponding to data encoded in the dataform;
   e) data compression module coupled to the signal processing circuitry for providing compressed digital data representative of the image of the target area;
   f) output port circuitry coupled to the decoder circuitry and the image compression circuitry for outputting at least one of the decoded dataform data and the compressed digital data representative of the image of the target area; and
   g) selection circuitry coupled to the decoder circuitry and the image compression circuitry for selectively outputting a selected one of the decoded dataform data and the compressed digital data representative of the image of the target area.

2. The portable data collection device of claim 1 wherein the selection circuitry comprises:
   a) a first manually activated trigger switch for selecting output of the decoded dataform data; and
   b) a second manually activated trigger switch for selecting output of the compressed digital data representative of the image of the target area.

3. The portable data collection device of claim 2 further including a hand held housing and wherein the first trigger switch and the second trigger switch are exterior of the housing.

4. The portable data collection device of claim 1 further including an RF transceiver coupled to the output port circuitry for telemetering at least one of the decoded dataform data and the compressed digital data representative of the image of the target area.

5. A portable data collection device comprising:
   a) an imaging assembly, including a two dimensional photosensor array comprising multiple rows of photosensor elements which are read out after an exposure period to generate a signal representative of an image of a two dimensional target area;
   b) an optic system positioned to focus illumination reflected from the target area onto the photosensor array;
   c) image buffering circuitry coupled to the imaging assembly, receiving the signal and buffering digital image data representative of the image of the target area;
   d) decoder circuitry coupled to the image buffering circuitry for decoding a portion of the digital image data representative of an image of a dataform in the target area and providing decoded dataform data corresponding to data encoded in the dataform;
   e) video capture circuitry coupled to the imaging assembly and receiving the signal, the video capture circuitry including analog to digital conversion circuitry for providing digital data corresponding to a video representation of the image of the target area;
   f) output port circuitry coupled to the decoder circuitry and the video capture circuitry for outputting at least one of the decoded dataform data and the digital data corresponding to the video representation of the image of the target area; and
   g) selection circuitry coupled to the decoder circuitry and the video capture circuitry for outputting a selected one of the decoded dataform data and the digital data corresponding to the video representation of the image of the target area.

6. The portable data collection device of claim 5 wherein the selection circuitry comprises:
a) a first manually activated trigger switch for selecting output of the decoded dataform data; and
b) a second manually activated trigger switch for selecting output of the digital data corresponding to the video representation of the image of the target area.

7. The portable data collection device of claim 6 further including a hand held housing and wherein the first trigger switch and the second trigger switch are exterior of the housing.

8. The portable data collection device of claim 5 further including an RF transceiver coupled to the output port circuitry for telemetering at least one of the decoded dataform data and the digital data corresponding to the video representation of the image of the target area.

9. The portable data collection device of claim 5 wherein the video capture circuitry further included image compression circuitry which operates on the digital data corresponding to the video representation of the image of the target area to generate compressed digital data corresponding to the video representation of the image of the target area.

10. The portable data collection device of claim 9 wherein the selection circuitry comprises:
a) a first manually activated trigger switch for selecting output of the decoded dataform data; and
b) a second manually activated trigger switch for selecting output of the compressed digital data corresponding to the video representation of the image of the target area.

11. The portable data collection device of claim 10 further including a hand held housing and wherein the first trigger switch and the second trigger switch are exterior of the housing.

12. The portable data collection device of claim 9 further including an RF transceiver coupled to the output port circuitry for telemetering at least one of the decoded dataform data and the compressed digital data corresponding to the video representation of the image of the target area.

13. A portable data collection device comprising:
a) an imaging assembly, including a two dimensional photosensor array comprising multiple rows of photosensor elements which are read out after an exposure period to generate a signal representative of an image of a two dimensional target area;
b) an optic system positioned to focus illumination reflected from the target area onto the photosensor array;
c) signal processing circuitry coupled to the two dimensional photosensor array, receiving the signal, converting the signal to digital image data representative of the image of the target area and buffering the digital image data;
d) decoder circuitry coupled to the signal processing circuitry for decoding a portion of the digital image data representative of an image of a dataform in the target area and providing decoded dataform data corresponding to data encoded in the dataform;
e) data compression module coupled to the signal processing circuitry for providing compressed digital data representative of the image of the target area;
f) output port circuitry coupled to the decoder circuitry and the image compression circuitry for outputing at least one of the decoded dataform data and the compressed digital data representative of the image of the target area;
g) an RF transceiver coupled to the decoder circuitry and the data compression module for transmitting at least one of the decoded dataform data and the compressed digital image data representative of the image of the target area; and
h) a portable, hand-held housing encasing the imaging assembly, the optic system, the signal processing circuitry, the decoder circuitry, the data compression module and the output port circuitry.

14. The portable data collection device of claim 13 further including a trigger switch positioned exteriorly of the housing for activating the data collection device to output at least one of the decoded dataform data and the compressed digital image data representative of the image of the target area.

15. The portable data collection device of claim 14 further including a display screen for displaying at least a portion of one of the decoded dataform data and the compressed digital image data representative of the image of the target area.

16. The portable data collection device of claim 13 further including a first manually activated trigger switch and a second manually activated trigger switch positioned exteriorly of the housing for activating the data collection device, activating the first trigger switch selecting output of the decoded dataform data and activating the second trigger switch selecting output of the compressed digital data representative of the image of the target area.

17. The portable data collection device of claim 16 further including a display screen for displaying at least a portion of one of the decoded dataform data and the compressed digital image data representative of the image of the target area.

18. A portable data collection device comprising:
a) an imaging assembly, including a two dimensional photosensor array comprising multiple rows of photosensor elements which are read out after an exposure period to generate a signal representative of an image of a two dimensional target area;
b) an optic system positioned to focus illumination reflected from the target area onto the photosensor array;
c) signal processing circuitry coupled to the two dimensional photosensor array, receiving the signal, converting the signal to digital image data representative of the image of the target area and buffering the digital image data;
d) decoder circuitry coupled to the signal processing circuitry for decoding a portion of the digital image data representative of an image of a dataform in the target area and providing decoded dataform data corresponding to data encoded in the dataform;
f) output port circuitry coupled to the decoder circuitry and the signal processing circuitry for outputing at least one of the decoded dataform data and the digital image data representative of the image of the target area;
g) an RF transceiver coupled to the decoder circuitry and the data compression module for transmitting at least one of the decoded dataform data and the compressed digital image data representative of the image of the target area; and h) a portable, hand-held housing encasing the imaging assembly, the optic system, the signal processing circuitry, the decoder circuitry, the data compression module and the output port circuitry; and i) a first manually activated trigger switch and a second manually activated trigger switch positioned exteriorly of the housing for activating the data collection device, activating the first trigger switch selecting output of the decoded dataform data and activating the second trigger switch selecting output of the digital image data representative of the image of the target area.

19. The portable data collection device of claim 18 further including a display screen for displaying at least a portion of one of the decoded dataform data and the digital image data representative of the image of the target area.

* * * * *

UNITED STATES PATENT AND TRADEMARK OFFICE
CERTIFICATE OF CORRECTION

| | | |
|---|---|---|
| PATENT NO. | : 5,818,028 | Page 1 of 1 |
| APPLICATION NO. | : 08/787668 | |
| DATED | : October 6, 1998 | |
| INVENTOR(S) | : Myerson et al. | |

It is certified that error appears in the above-identified patent and that said Letters Patent is hereby corrected as shown below:

Title Page
     Related U.S. Application Data
[63] Should read as follows: --This application is a division of Ser. No. 580,063 Dec. 20, 1995 and now U.S. Patent 5,703,349, which is a continuation-in-part of Ser. No. 544,618, Oct. 18, 1995, and Ser. No. 494,435, Jun. 26, 1995. --

Column 1, line 8, after "is" insert -- a division of Application Ser. No. 08/580,063 filed on Dec. 20, 1995 which is--

Signed and Sealed this

Twenty-ninth Day of August, 2006

JON W. DUDAS
*Director of the United States Patent and Trademark Office*